(12) United States Patent
Nieweglowski et al.

(10) Patent No.: US 11,226,050 B2
(45) Date of Patent: Jan. 18, 2022

(54) METHOD FOR PRODUCING A VALVE HOUSING AND VALVE

(71) Applicant: ETO Magnetic GmbH, Stockach (DE)

(72) Inventors: Marcin Nieweglowski, Jelenia Góra (PL); Andrzej Pyza, Chrzastawa Wielka (PL); Johannes Wener, Radolfzell am Bodensee (DE); Michael Feindler, Stockach (DE)

(73) Assignee: ETO Magnetic GmbH, Stockach (DE)

(*) Notice: Subject to any disclaimer, the term of this patent is extended or adjusted under 35 U.S.C. 154(b) by 158 days.

(21) Appl. No.: 16/303,692

(22) PCT Filed: Mar. 30, 2017

(86) PCT No.: PCT/EP2017/057552
§ 371 (c)(1),
(2) Date: Nov. 21, 2018

(87) PCT Pub. No.: WO2017/202531
PCT Pub. Date: Nov. 30, 2017

(65) Prior Publication Data
US 2020/0318748 A1    Oct. 8, 2020

(30) Foreign Application Priority Data
May 23, 2016  (DE) .................. 10 2016 109 404.8

(51) Int. Cl.
*F16K 27/02*    (2006.01)
(52) U.S. Cl.
CPC .................. *F16K 27/029* (2013.01)

(58) Field of Classification Search
CPC ........................ F16K 27/029; B29C 65/645
See application file for complete search history.

(56) References Cited

U.S. PATENT DOCUMENTS

| 3,533,865 | A | * | 10/1970 | Bocquet | ............... B29C 66/836 156/73.4 |
| 4,530,449 | A | | 7/1985 | Nozawa et al. | |
| 6,084,493 | A | * | 7/2000 | Siegel | .................... B60T 8/363 251/129.15 |
| 6,244,295 | B1 | * | 6/2001 | Bartussek | ............... B60T 8/341 137/539 |
| 2004/0118459 | A1 | | 6/2004 | Cornea et al. | |

FOREIGN PATENT DOCUMENTS

| CN | 103244716 A | 8/2013 |
| DE | 3050097 C2 | 5/1986 |
| DE | 19510647 C1 | 2/1996 |
| DE | 10144289 A1 | 4/2003 |
| DE | 102010018206 A1 | 10/2011 |
| DE | 102012201548 A1 | 8/2013 |

OTHER PUBLICATIONS

International search report for patent application No. PCT/EP2017/057552 dated Jul. 4, 2017.

* cited by examiner

*Primary Examiner* — Reinaldo Sanchez-Medina
*Assistant Examiner* — Nicole Gardner
(74) *Attorney, Agent, or Firm* — Bachman and Lapointe PC; George Coury

(57) ABSTRACT

The invention relates to a method for producing a valve housing (1) having a plastic body (2) with at least one fluid opening (5) which is protected by means of a filter (6) against the inlet of dirt.

16 Claims, 1 Drawing Sheet

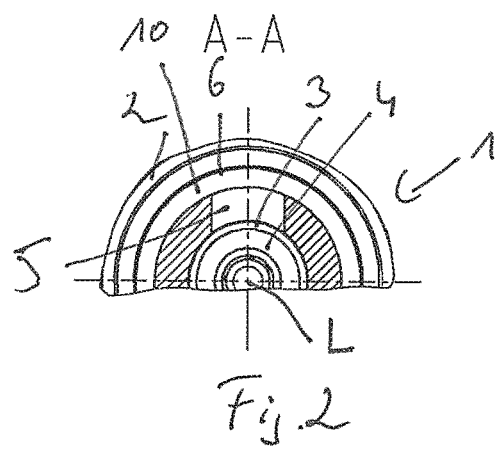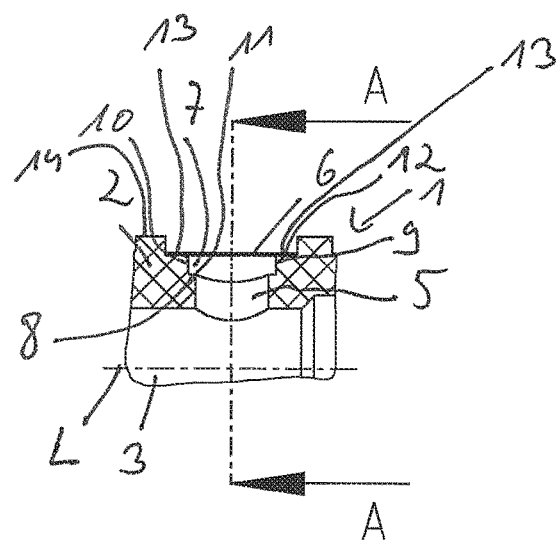

METHOD FOR PRODUCING A VALVE HOUSING AND VALVE

BACKGROUND OF THE INVENTION

The invention relates to a method for producing a valve housing which has a plastic body having at least one fluid opening, in particular a gas inlet opening, preferably an air inlet opening or a liquid inlet opening, in particular an oil inlet opening, protected against passage of dirt, in particular against introduction of dirt, by means of a screen, and to a valve, in particular an electromagnetically operable valve, comprising a valve housing, the valve housing of the valve having a plastic body having at least one fluid opening protected against passage of dirt by means of a screen, a vent port and/or a pressure port and/or a working port being preferably assigned to said fluid opening.

In order to retain particles from a working fluid, such as a hydraulic medium, it is known for a screen (filter) to be assigned to fluid openings of valves. In the case of plastic valve housings, the plastic material is injection-molded around the screens during production of the valve housing so as to ensure suitable dimensional stability. This approach is complex and costly in particular in terms of the implementation of the injection-molding process, in which the screen has to be placed in the injection mold beforehand. Moreover, this method is limited to the use of metal screens.

DE 195 10 647 C1 describes a pressure control valve in which multiple radial bores are provided in a valve housing, a screen being placed in each of said bores and held there by means of a retaining ring. This manner of installing the screens in the valve housing is complex and expensive.

From DE 101 44 289 B4, a method whose application is limited to metal valve housings is known, according to which the screen, which is also made of metal, is laser-welded to the metal housing. Alternatively, the screen is clipped to the valve housing mechanically.

SUMMARY OF THE INVENTION

Based on the aforementioned state of the art, the object of the invention is to provide a simple and cost-effective alternative method for producing a plastic valve housing which has a screen (filter) for avoiding passage of dirt, in particular introduction of dirt into the valve, at at least one fluid opening in the flow path, wherein technically complex and structurally elaborate locking or clipping connections are to be avoided. The method is supposed to preferably be equally suitable for the use of screens made of various materials, in particular of plastic, cloth or metal.

Furthermore, the object is to provide a valve, in particular a valve producible and/or produced by a method of this kind, which is cost-effective and, more preferably, electromagnetically operable.

With regard to the method, said object is attained by the features disclosed herein, i.e. in a generic method by first providing a preferably injection-molded plastic body having the at least one fluid opening and then fixing the screen to the plastic body (in the later flow path of the fluid), i.e. not during but after the plastic body has been produced, namely by melting the plastic body surface in a fixing area by externally applying ultrasound and exerting contact pressure on the screen (against the fixing area) to press the screen against the fixing area and then cooling the fixing area, thus resolidifying the molten plastic surface. Cooling can alternatively happen actively, such as by means of a fan, or passively by letting the plastic body rest or transporting it at ambient temperature or waiting after the melting process has been completed.

With regard to the valve, the object is attained by the feature disclosed herein, i.e. in the case of a generic valve by the screen being fixed to a fixing area of the plastic surface that has been molten by application of ultrasound and resolidified, the screen in particular being embedded (into the resolidified plastic material) and/or welded, i.e. material-bonded, thereto.

Advantageous embodiments of the invention are indicated in the dependent claims. Any and all combinations of at least two of the features disclosed in the description, in the claims and/or in the figures shall fall within the scope of the invention.

To avoid redundancies, features disclosed in accordance with the device shall also be deemed disclosed and claimable in accordance with the method. Likewise, features disclosed in accordance with the method shall also be deemed disclosed and claimable in accordance with the device; in particular, structural features of the valve or of valve components discussed in connection with the method and resulting from the method shall be deemed disclosed and claimable as advantageous embodiments of the valve.

The invention is based on the idea that screens (filters) against passage of dirt in the flow path of the fluid to be fixed to the plastic body, in particular wall-side, by applying ultrasound in such a manner that the application of ultrasound melts the plastic body surface in a fixing area, in particular at the outer circumference of the plastic body, i.e. causes the plastic material to superficially liquefy or at least enter a ductile state, and the screen is pressed against and/or into said liquefied or ductile plastic material so that the plastic material, once solidified, holds the screen, in particular at the outer circumference of the plastic body. In other words, according to the invention, the screen is fixed after production of the plastic body, in particular by injection molding, i.e. not during production, namely by ultrasonic technology, which is procedurally easy to use and cost-effective and by means of which the plastic material of the plastic body is molten in a fixing area, and the screen is held by the plastic material, once resolidified, by, as will be explained later, partial embedding, in particular edge-side embedding, of the screen in the plastic material and/or by producing a welded or material-bonded connection depending on the material selected for the screen. In contrast to the connection methods known from the state of the art, the method according to the invention also allows plastic screens to be used; moreover, in particular in the event that metal screens are used, the procedurally complex and costly laser welding process is no longer necessary.

With the method according to the invention, overall, a cost-effective, preferably electromagnetically operable valve is provided, as is a valve housing of the valve, passage of dirt through a fluid opening, in particular introduction of dirt into the valve body, being safely prevented by the screen preferably disposed at the wall and preferably assigned to a radial fluid opening.

The screen openings are selected such that the dirt particles in the fluid are reliably retained. Typically, the diameter of the screen openings is in the range between approximately 100 and 300 micrometers.

It is particularly advantageous if the plastic body of the housing is made of glass fiber reinforced plastic; alternatively, the plastic body can be free of glass fibers.

It has proven particularly advantageous to apply ultrasound for melting the plastic body surface in the fixing area by means of a contact ram which also serves to apply contact pressure to the screen. In other words, ultrasound is applied externally, in particular simultaneously to the contact pressure, in either case by means of a contact ram via and to the screen. The contact ram, in turn, is subjected to ultrasound preferably with the aid of an ultrasonic transmitter known per se from ultrasonic welding techniques, for example.

It has proven particularly advantageous if the contact ram for applying ultrasound and for applying contact pressure to the screen has a contact surface which serves to come into contact with the screen or to sandwich the screen between the contact surface and the fixing area and which is shaped, in particular curved, to match the fixing area, particularly preferably in the shape of an inner cylinder segment.

As indicated in the beginning, there are different options regarding the specific design of the fixation or connection between the screen and the plastic material of the plastic body. In the event that the screen is made of a material, in particular a plastic material, which at least partially melts when ultrasound is applied as per the invention, the method according to the invention can produce a material-bonded welded connection to be formed between the screen and the plastic body by the application of ultrasound, the screen material and the plastic body material mixing in said material-bonded weld.

Additionally or alternatively, in particular in the event that application of ultrasonic application does not or only slightly or partially melt the screen material in the area to which ultrasound is applied, the contact pressure applied can move the screen into the material of the fixing area, i.e. into the plastic body, in particular partially embed it therein. In other words, the screen is anchored in the plastic material, which will partially surround the screen material after solidification.

A variation in which the screen is disposed at the outside on top of a circumferential groove, which is preferably configured as a fully circumferential ring channel and has the at least one fluid opening, preferably multiple fluid openings distributed across the circumference, and is fixed to both groove sides of the plastic body by applying ultrasound, the groove sides preferably being spaced apart along the axial extension of the valve body, has proven particularly advantageous in terms of the method. In other words, fixing areas, in particular circumferential fixing areas, which are molten by applying ultrasound in order to hold the screen after cooling are located laterally above both groove walls of the aforementioned preferably fully circumferential groove. In a particularly preferred case, the screen is fixed on both groove sides simultaneously, in particular by means of multiple rams or a shared ram bridging the groove. It has proven particularly advantageous if the groove has a ring shoulder on either side, said ring shoulder being recessed or offset radially inward in relation to an outer sleeve contour of the plastic body and forming the respective fixing area.

In particular with regard to a previously described embodiment in which the screen is spread across a groove or disposed on top of a groove, but not limited thereto, it has proven particularly advantageous if the screen is band-shaped and is laid around the plastic body, in particular across a circumferential angle of at least 90°, preferably of at least 180°, more preferably of at least 270°, in particular preferably of 360° around the plastic body, prior to the application of ultrasound and is subjected to ultrasound during that or afterward, in particular by means of at least one ram, to melt the plastic body.

The invention also relates to a valve having a valve housing, which is preferably produced by a method according to the invention and in which a valve body can preferably be displaced axially along the length of the valve housing, in particular by energizing electric coil means. The valve housing comprises a plastic body, which is a plastic injection-molded part, for example, and which has at least one preferably wall-side or radial or axial fluid opening which is protected against passage of dirt by means of a screen, a vent port and/or a pressure port and/or a working port of the valve preferably being assigned to said fluid opening. According to the invention, the screen is fixed to, in particular embedded in and/or welded, i.e. connected by material bonding, to a fixing area of the plastic body surface, said fixing area having been molten by applying ultrasound and resolidified.

As mentioned, a valve body can preferably be axially displaced in the valve housing by energizing coil means (electrical winding), wherein the valve body is either formed directly by an armature of an electromagnetic drive or can be displaced or operated by means of such an armature.

Other advantages, features, and details of the invention are apparent from the following description of a preferred embodiment and from the drawing.

BRIEF DESCRIPTION OF THE DRAWINGS

FIG. 1 sectionally shows a longitudinal-section view through a valve housing according to the invention, and FIG. 2 shows a cross-section view of the housing along section line A-A of FIG. 1.

In the Figures, identical elements and elements having identical functions are marked with identical reference signs.

DETAILED DESCRIPTION

FIGS. 1 and 2 sectionally show a valve housing 1 of an electromagnetic valve in different sectional views, said valve housing 1 comprising a plastic body 2, which is injection-molded, for example, and in which an axial channel 3 is formed for a valve body 4, which is piston-shaped, for example, and which can be electromagnetically actuated by energizing coil means (not shown) so as to interact with a valve seat in a sufficiently known manner. A fluid opening 5, which is an inlet opening in the case at hand and through which fluid can flow into the axial channel 3 from outside via a valve port assigned to the fluid opening 5, is located in the wall of the plastic body 2. A (filter) screen 6 is disposed in this fluid path in order to retain dirt particles. The screen 6 is band-shaped and extends across 360° around the substantially cylindrical valve housing 1, namely about its longitudinal center axis L, in the circumferential direction. A circumferential groove 7 in the plastic body 2 in whose groove bottom 8 the fluid opening 5 is formed is assigned to the screen 6; preferably, multiple fluid openings 5 of this kind are distributed across the circumference of the circumferential groove 7, in particular in the area of the groove bottom 8. Starting from the groove bottom, two groove walls 9, 10 disposed opposite and, exemplarily and preferably, parallel to each other, extend outward in the radial direction and reach up to a respective ring shoulder 11, 12, each ring shoulder 11, 12 extending in the circumferential and axial directions. On each ring shoulder 11, 12, a fixing area 13 is formed on the plastic body surface 14 (on the respective ring shoulder 11, 12 in the specific embodiment). In other words, a fixing area to which the screen 6 is fixed is located on either axial side of the longitudinal center axis L of the circumferential groove 7 extending in the circumferential direction.

In order to fix the screen 6 to the plastic body 2, the screen 6 is pressed against the plastic body from outside, more precisely from radially outside to radially inside, by means of a contact ram which simultaneously applies ultrasonic waves to the screen 6 and thus to the plastic body 2 via an ultrasonic transmitter. The application of ultrasound causes the plastic material of the plastic body 2 to melt in the area of the fixing areas 13 and to thus become liquid or ductile; depending on the selected screen material, it merely heats or it also partially melts. In either case, the screen 6 will be fixed to, in particular within, the fixing area 13, in particular embedded therein and/or material-bonded, i.e. welded thereto, once the plastic material of the plastic body 2 has cooled and thus resolidified. As can be seen from a combined view of FIGS. 1 and 2, the ring shoulders 11, 12 form the groove bottom of another groove, which is formed radially outside of the circumferential groove 7 and in whose groove bottom the circumferential groove 7 is formed, in turn. It inevitably follows that the ring shoulders 11, 12 are offset radially inward in relation to an outer circumferential sleeve contour of the valve housing 1, which means that the screen 6 is offset inward in the radial direction in relation to said outer contour and is thus well-protected.

REFERENCE SIGNS 1 valve housing
2 plastic body
3 axial channel
4 valve body
5 fluid opening
6 screen
7 circumferential groove
8 groove bottom
9, 10 groove wall
11, 12 ring shoulder
13 fixing area
14 plastic body surface
L longitudinal center axis of the valve body

The invention claimed is:

1. A method for producing a valve housing (1) having a plastic body (2) having at least one radially oriented fluid opening (5) which is protected against passage of dirt by means of a screen (6), the method comprising the following steps:
    providing the plastic body (2) having the at least one radially oriented fluid opening (5);
    fixing the screen (6) to the plastic body (2) by melting a plastic body surface (14) of the plastic body (2) in a fixing area (13) by externally applying ultrasound to provide a melted plastic body surface (14) and applying radially inwardly directed contact pressure to the screen (6) to press the screen (6) radially inwardly against the fixing area (13); and
    cooling the fixing area (13), thus resolidifying the melted plastic body surface (14);
    wherein the screen (6) is band-shaped and is laid around the plastic body (2), across a circumferential angle of at least 90° around the plastic body (2), prior to the application of ultrasound, and
    wherein the screen (6) is made of a material which at least partially melts during application of ultrasound and wherein the application of ultrasound causes a material-bonded welded connection to be produced between the screen (6) and the plastic body (2).

2. The method according to claim 1, wherein ultrasound is applied via the screen (6) by means of a contact ram for applying the radially inwardly directed contact pressure to the screen (6) at the same time as the screen (6) is being pressed against the fixing area (13).

3. The method according to claim 2, wherein the contact ram has a contact surface which serves to come into contact with the screen (6) and which is shaped to match the fixing area (13).

4. The method according to claim 1, wherein the screen (6) is sunk into, and partially embedded in, the molten material of the fixing area.

5. The method according to claim 1, wherein the screen (6) is disposed above an outer circumferential groove (7) which has the at least one radially oriented fluid opening (5), and fixing areas (13) are formed on both groove sides of the plastic body (2) on each ring shoulder (11, 12), the screen (6) being fixed to said fixing areas (13) by the application of ultrasound.

6. The method according to claim 5, wherein the at least one radially oriented fluid opening (5) comprises multiple radially oriented fluid openings, distributed across the circumference, and wherein the outer circumferential groove (7) is configured as a fully circumferential ring channel.

7. The method according to claim 1, wherein the plastic body (2) is made of glass fiber reinforced plastic or of plastic free of glass fibers.

8. The method according to claim 1, wherein the plastic body (2) is an injection-molded plastic body (2).

9. The method according to claim 1, wherein the circumferential angle is at least 180°.

10. The method according to claim 1, wherein the circumferential angle is at least 270°.

11. The method according to claim 1, wherein the circumferential angle is at least 360°.

12. A valve having a valve housing (1) which is produced by a method according to claim 1, the valve housing (1) having a plastic body (2) having at least one radially oriented fluid opening (5) which is protected against passage of dirt by means of a screen (6), a vent port and/or a pressure port and/or a working port assigned to said fluid opening (5), wherein the screen (6) is band-shaped and is laid around the plastic body (2), across a circumferential angle of at least 90° around the plastic body (2), and wherein the screen (6) is made of plastic material and fixed to a fixing area (13) of the plastic body surface (14), said fixing area (13) having been molten by application of ultrasound and resolidified.

13. The valve according to claim 12, wherein the valve has coil means which can be energized to displace an armature and/or a valve body (4) in the valve housing (1).

14. The valve according to claim 12, wherein the screen (6) is disposed radially outside above an outer circumferential groove (7) which has the at least one radially oriented fluid opening (5), and fixing areas (13) are formed on both groove sides of the plastic body (2), on each ring shoulder (11, 12), the screen (6) being fixed to said fixing areas (13) by the application of ultrasound.

15. The valve according to claim 14, wherein the at least one radially oriented fluid opening (5) comprises multiple radially oriented fluid openings (5) distributed across the circumference, and wherein the outer circumferential groove (7) is configured as a fully circumferential ring channel.

16. The valve according to claim 12, wherein the at least one radially oriented fluid opening (5) is a wall-side fluid opening (5) and wherein the screen is embedded in and/or welded to the fixing area (13).

\* \* \* \* \*